United States Patent
Serban et al.

(10) Patent No.: US 9,167,463 B2
(45) Date of Patent: Oct. 20, 2015

(54) COMMUNICATION NODE OPERABLE TO ESTIMATE FAULTS IN AN AD HOC NETWORK AND METHOD OF PERFORMING THE SAME

(75) Inventors: Constantin Serban, Metuchen, NJ (US); Akshay Vashist, Plainsboro, NJ (US); Rauf Izmailov, Plainsboro, NJ (US); Ritu Chadha, Hillsborough, NJ (US); Kyriakos Manousakis, New Brunswick, NJ (US); Cho-Yu Jason Chiang, Clinton, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 399 days.

(21) Appl. No.: 13/602,796

(22) Filed: Sep. 4, 2012

(65) Prior Publication Data

US 2014/0355454 A1   Dec. 4, 2014

Related U.S. Application Data

(60) Provisional application No. 61/530,801, filed on Sep. 2, 2011.

(51) Int. Cl.
*H04L 12/24* (2006.01)
*H04W 84/18* (2009.01)
*H04W 24/10* (2009.01)
*H04W 24/08* (2009.01)
*H04W 4/00* (2009.01)

(52) U.S. Cl.
CPC ........... *H04W 24/10* (2013.01); *H04L 41/0631* (2013.01); *H04L 41/142* (2013.01); *H04L 41/16* (2013.01); *H04W 24/08* (2013.01); *H04W 84/18* (2013.01)

(58) Field of Classification Search
CPC ..... H04W 24/10; H04W 24/08; H04W 84/18; H04L 41/142; H04L 41/16; H04L 41/0631
See application file for complete search history.

(56) References Cited

U.S. PATENT DOCUMENTS

| 5,197,127 | A  | * | 3/1993 | Waclawsky et al. | 709/224 |
| 6,622,160 | B1 | * | 9/2003 | Horvitz | 709/206 |
| 6,785,240 | B1 | * | 8/2004 | Cao et al. | 370/238 |
| 7,397,766 | B2 | * | 7/2008 | Kodialam et al. | 370/252 |
| 7,969,914 | B1 | * | 6/2011 | Gerber et al. | 370/256 |
| 8,131,838 | B2 | * | 3/2012 | Bornhoevd et al. | 709/224 |

(Continued)

OTHER PUBLICATIONS

Bo Yan; Guanling Chen, "Model-based fault Diagnosis for IEEE 802.11 wireless LANs," Mobile and Ubiquitous Systems: Networking & Services, MobiQuitous, 2009. MobiQuitous '09. 6th Annual International , vol., No., pp. 1,10, Jul. 13-16, 2009 doi: 10.4108/ICST.MOBIQUITOUS2009.6833.*

(Continued)

*Primary Examiner* — Andrew Lai
*Assistant Examiner* — Hoyet H Andrews

(57) ABSTRACT

A communication node operable to estimate faults in a mobile ad hoc network and method of performing the same. In one embodiment, the communication node includes a processor and memory including computer program code configured to, with the processor, cause the communication node to monitor a set of observable parameters at the communication node, produce a fault estimate at the communication node from the set of observable parameters, and provide the fault estimate to a global fault detector at another communication node.

26 Claims, 8 Drawing Sheets

(56) References Cited

U.S. PATENT DOCUMENTS

| | | | |
|---|---|---|---|
| 8,462,619 B2* | 6/2013 | Clemens et al. | 370/216 |
| 2003/0163729 A1* | 8/2003 | Buchegger | 713/201 |
| 2003/0202468 A1* | 10/2003 | Cain et al. | 370/229 |
| 2003/0202469 A1* | 10/2003 | Cain | 370/230 |
| 2003/0202476 A1* | 10/2003 | Billhartz et al. | 370/236 |
| 2003/0204587 A1* | 10/2003 | Billhartz | 709/224 |
| 2003/0204616 A1* | 10/2003 | Billhartz et al. | 709/235 |
| 2003/0204623 A1* | 10/2003 | Cain | 709/241 |
| 2003/0204625 A1* | 10/2003 | Cain | 709/243 |
| 2004/0022223 A1* | 2/2004 | Billhartz | 370/338 |
| 2004/0028000 A1* | 2/2004 | Billhartz | 370/312 |
| 2004/0029553 A1* | 2/2004 | Cain | 455/403 |
| 2004/0030537 A1* | 2/2004 | Barnard | 702/194 |
| 2004/0049365 A1* | 3/2004 | Keller et al. | 702/186 |
| 2004/0160943 A1* | 8/2004 | Cain | 370/351 |
| 2004/0203820 A1* | 10/2004 | Billhartz | 455/452.1 |
| 2004/0218548 A1* | 11/2004 | Kennedy et al. | 370/254 |
| 2004/0218630 A1* | 11/2004 | An | 370/470 |
| 2004/0219909 A1* | 11/2004 | Kennedy et al. | 455/422.1 |
| 2004/0228282 A1* | 11/2004 | Bao et al. | 370/252 |
| 2004/0252643 A1* | 12/2004 | Joshi | 370/238 |
| 2005/0053005 A1* | 3/2005 | Cain et al. | 370/235 |
| 2005/0053094 A1* | 3/2005 | Cain et al. | 370/469 |
| 2005/0180444 A1* | 8/2005 | Gu et al. | 370/412 |
| 2006/0082444 A1* | 4/2006 | Sweeney et al. | 340/10.3 |
| 2006/0212556 A1* | 9/2006 | Yacoby et al. | 709/223 |
| 2006/0239216 A1* | 10/2006 | Chen et al. | 370/310 |
| 2006/0268688 A1* | 11/2006 | Isozu | 370/227 |
| 2006/0271297 A1* | 11/2006 | Repelli et al. | 702/3 |
| 2007/0109982 A1* | 5/2007 | Gudipudi et al. | 370/310.2 |
| 2007/0111735 A1* | 5/2007 | Srinivasan et al. | 455/456.1 |
| 2008/0007445 A1* | 1/2008 | Leach et al. | 342/21 |
| 2008/0037444 A1* | 2/2008 | Chhabra | 370/254 |
| 2008/0155689 A1* | 6/2008 | Denninghoff et al. | 726/22 |
| 2008/0165721 A1* | 7/2008 | Fujii et al. | 370/315 |
| 2008/0232344 A1* | 9/2008 | Basu et al. | 370/350 |
| 2009/0089627 A1* | 4/2009 | Matsubara et al. | 714/48 |
| 2009/0157573 A1* | 6/2009 | Anderson et al. | 706/12 |
| 2009/0252134 A1* | 10/2009 | Schlicht et al. | 370/338 |
| 2009/0279463 A1* | 11/2009 | Kuliner et al. | 370/311 |
| 2010/0054179 A1* | 3/2010 | Meyer | 370/328 |
| 2010/0067533 A1* | 3/2010 | Yoshida et al. | 370/401 |
| 2010/0074119 A1* | 3/2010 | Krishnaswamy | 370/242 |
| 2010/0151789 A1* | 6/2010 | Suzuki et al. | 455/41.2 |
| 2010/0162051 A1* | 6/2010 | Yoon et al. | 714/47 |
| 2010/0232326 A1* | 9/2010 | Kellerman et al. | 370/310 |
| 2010/0325489 A1* | 12/2010 | Nakadai | 714/26 |
| 2011/0069606 A1* | 3/2011 | Park et al. | 370/216 |
| 2011/0177786 A1* | 7/2011 | Marano et al. | 455/67.11 |
| 2011/0208474 A1* | 8/2011 | Tanabiki et al. | 702/150 |
| 2011/0208496 A1* | 8/2011 | Bando et al. | 703/2 |
| 2011/0216692 A1* | 9/2011 | Lundsgaard et al. | 370/328 |
| 2011/0222515 A1* | 9/2011 | Wang et al. | 370/338 |
| 2012/0185728 A1* | 7/2012 | Guo et al. | 714/26 |
| 2012/0287802 A1* | 11/2012 | Girault | 370/252 |
| 2013/0197799 A1* | 8/2013 | Cho et al. | 701/430 |
| 2013/0252631 A1* | 9/2013 | Alizadeh-Shabdiz et al. | 455/456.1 |
| 2013/0272116 A1* | 10/2013 | Fujihira et al. | 370/228 |
| 2013/0273938 A1* | 10/2013 | Ng et al. | 455/456.1 |
| 2013/0311628 A1* | 11/2013 | Kruglick | 709/223 |
| 2014/0067256 A1* | 3/2014 | Aoki et al. | 701/417 |

OTHER PUBLICATIONS

M. Agarwal and V. Madduri, "Correlating Failures with Asynchronous Changes for Root Cause Analysis in Enterprise Enviornments," Proceeding of DSN 2010, 517-526.

I. Eyal, I. Keidar, and R. Rom, "Distributed Clustering for Robust Aggregation in Large Networks," Proceedings DSN 2009.

O. Rutti, Z. Milosevic and A. Schiper, "Generic Construction of Consensus Algorithms for Benign and Byzantine Faults," DSN 2010, pp. 343-352.

M. Vieira, H. Madeira, I. Irrera, and M. Malek, "Fault Injection for Failure Prediction Methods Validation," Proceedings of DSN 2009.

P. Xie, J. Li, P. Liu, and R. Levy, "Using Bayesian Networks for Cyber Security Analysis," Proceedings of DSN 2010, pp. 211-220.

* cited by examiner

COMMUNICATION NODE OPERABLE TO ESTIMATE FAULTS IN AN AD HOC NETWORK AND METHOD OF PERFORMING THE SAME

CROSS REFERENCE TO RELATED APPLICATION

This application claims the benefit of U.S. Provisional Application No. 61/530,801, entitled "Towards Networks Invariant Fault Detection for MANETs via Statistical Modeling," filed on Sep. 2, 2011, which is incorporated herein by reference.

GOVERNMENT RIGHTS

This invention was developed in part from funding provided under W15P7T-08-C-P213 and W15P7T-09-C-S634 awarded by the U.S. Army. The Government has certain rights in this invention.

TECHNICAL FIELD

The present invention is directed, in general, to wireless communication systems and, more specifically, to a communication node operable to estimate faults in a mobile ad hoc network and method of performing the same.

BACKGROUND

Fault, configuration, accounting, performance and security ("FCAPS") systems have long been recognized to play a role in a management of communication networks, ensuring their availability, performance, and dependability under a wide array of operational conditions. Fault detection and localization represents a component of the FCAPS providing an ability to continuously monitor and assess the health of a network, and to accurately and proactively discover potential problems. While traditional wired networks have benefited from advances in fault detection technologies, fault detection in mobile ad hoc networks ("MANETs") (also referred to as ad hoc networks) remains largely a matter of art rather than engineering, despite the important role such ad hoc networks occupy in defense, critical emergency response, and other life-sustaining support areas.

Fault detection and localization in ad hoc networks is significantly more challenging than in static networks due to several characteristics thereof. The ad hoc networks generally have very limited bandwidth available for network management activities, higher prevalence of faults due to adverse operational environments, and larger variability of conditions due to mobility and ad hoc organization. These constraints often limit the adoption of traditional fault managers in ad hoc environments. Additionally, fault detection procedures specifically designed for ad hoc networks are hard to maintain and prone to fragility when facing even minor modifications or adaptation.

While this might be acceptable in some stable, traditional networks, these are obstacles in the environment of the ad hoc networks. First, at this technological stage, the basic technologies of the ad hoc networks are still rapidly evolving, which often trigger redesign and refactoring on FCAPS components and dependent systems. Second, expert knowledge and understanding of the operations and maintenance of ad hoc networks remains scarce due to newness of the area and the difficulty of the problem. Also, interactions and dependencies between ad hoc network elements are more complex and difficult to predict because each communication node often includes router capabilities and the nature of the topologies is inherently unstable.

Fault detection and localization represent important network management activities that enable networks to operate in a dependable manner, while maintaining network performance and availability. Despite its importance, fault detection and localization in the ad hoc networks remains difficult due to the challenging nature of such networks, which have now become substantial hindrances for operating the same. Among the chief obstacles facing fault detection in the ad hoc networks are the limited available bandwidth for collecting measurements, inherent centralization of traditional methods unsuitable for ad hoc networks, and fragility of fault models facing variable network conditions and network reconfigurations. Accordingly, what is needed in the art is a system and method for fault estimation and detection that overcomes the deficiencies in the present solutions.

SUMMARY OF THE INVENTION

These and other problems are generally solved or circumvented, and technical advantages are generally achieved, by advantageous embodiments of the present invention, including a communication node operable to estimate faults in a mobile ad hoc network and method of performing the same. In one embodiment, the communication node includes a processor and memory including computer program code configured to, with the processor, cause the communication node to monitor a set of observable parameters at the communication node, produce a fault estimate at the communication node from the set of observable parameters, and provide the fault estimate to a global fault detector at another communication node.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

Figure 1:
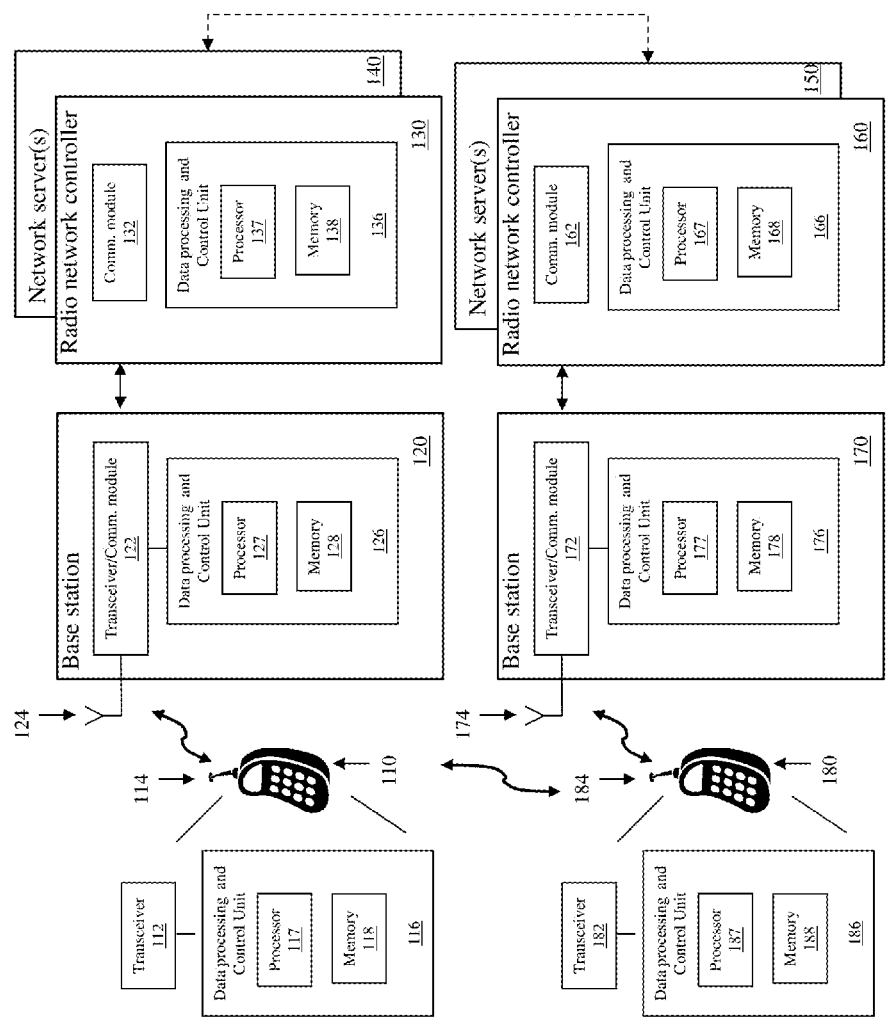
FIG. 1 illustrates a system level diagram of an embodiment of a communication system operable to provide a fault estimation and localization system.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems and modules associated with an application programming interface routing system.

A system for fault estimation and localization will be described with respect to exemplary embodiments in a specific context, namely, a fault estimation and localization system operable in an ad hoc wireless network. While the principles will be described in the environment of a wireless communication network, any environment that may benefit from a learning based fault estimation and localization system is well within the broad scope of the present disclosure.

A fault estimation and localization system, also referred to herein as the learning based fault detector, is introduced for ad hoc networks. The learning based fault detector introduces several processes. First, fault estimation employs learning techniques for normal behavior of the ad hoc network as well as typical manifestations of faults. Normal behavior and typical manifestations of faults are learned and condensed automatically by the learning based fault detector into accurate fault models without reliance on understanding of minute characteristics of the network. This avoids fragility of the models by employing learning techniques. Second, the learning based fault detector uses a combined local and global architecture wherein main detection and estimation functionality takes place at the communication nodes in the network based on local information. A thin, global detection layer is responsible for reconciling fault estimates and fault locations. This architecture conserves bandwidth by not hauling large amounts of measurements throughout the network. This architecture is robust as the global layer can operate on limited and partial data. The global layer can operate in a decentralized manner, as reconciliation of faults and fault locations can take place at multiple points throughout the network.

The learning based fault detector uses a supervised learning technique based on support vector machines ("SVMs"), a process that produces a reliable model by balancing complexity of a learned function with noise in the training data. This process is both accurate in identifying faults of interest, and it is also capable of accommodating network variability, which is inherent in ad hoc networks.

While machine learning techniques have been applied to various domains, including networked domains, using learning techniques to assess the health of an ad hoc network is challenging due to several factors. One challenging factor to assess the health of an ad hoc network is data localization. Data that forms a decision base for determining a network state is often distributed across the network. While concentrating the data in a single point and making a comprehensive and qualified decision represents a luring proposition, this is rarely achievable in practice due to unacceptable overhead on transferring large amounts of data to a single location, as well as associated security and dependability risks. A localized method is introduced wherein local information is leveraged to produce an estimate regarding the state of the network.

Another challenging factor that affects an assessment of health of an ad hoc network is incomplete and inconsistent knowledge of ad hoc network health. Data exchanges between communication nodes can itself be affected by the very faults that are to be discovered through such exchanges. As a result, the communication nodes are often able to communicate with a limited and continually changing set of peer communication nodes, which results in systematically dealing with incomplete and inconsistent data. The learning based fault detector employs loose interactions among communication nodes to improve locally obtained detection accuracy.

A further challenging factor that affects an assessment of health of an ad hoc network is the use of specific scenarios from which learning data is obtained. Data used for learning is intrinsically tied to the interaction scenario from which the data was derived. Learning over specific data can produce models that are intrinsically tied to the specific scenarios, thereby producing fragile models that are unable to cope with continually morphing topologies and unseen interactions. As described further hereinbelow, techniques for transforming the data are introduced to separate general and useful information necessary for determining the state of the network from scenario-specific, fragile information. These considerations and constraints result in an architecture that inherently conserves network bandwidth. The architecture is robust under faulty conditions and accommodates network variability inherent in an ad hoc network.

Turning now to FIG. 1, illustrated is a system level diagram of an embodiment of a communication system operable to provide a fault detection and localization system. The communication system may form a portion of a cellular terrestrial radio access network and includes a user equipment 110 communicating wirelessly and bidirectionally with a base station 120 coupled to a radio network controller 130. The user equipment 110 may be equipped with a local fault detector. The radio network controller 130 is coupled, in turn, to a server(s) 140 that may include a global fault detector. The server 140 is coupled to another radio network controller 160 which is coupled to another base station 170. The another base station 170 is coupled wirelessly and bidirectionally to another user equipment 180. The base station 120 and radio network controller 130 may be provided by a service provider and the another base station 170 and another radio network controller 160 may be provided by another service provider. The another radio network controller 160 is coupled, in turn, to a server(s) 150 that may include a global fault detector.

The user equipment 110 and the another user equipment 180 are formed with a transceiver 112, 182, respectively, coupled to an antenna 114, 184, respectively. Of course, multiple antennas may be employed to advantage. The user equipment 110 and the another user equipment 180 include a data processing and control unit 116, 186, respectively, formed with a processor 117, 187, respectively, coupled to a memory 118, 188, respectively. Of course, the user equipment 110 and the another user equipment 180 include other elements such as a keypad, a display, interface devices, etc. The user equipment 110 and the another user equipment 180 are generally a self-contained wireless communication device intended to be carried by an end user (e.g., subscriber stations, terminals, mobile stations, machines, or the like).

The base station 120 and the another base station 170 are formed with a transceiver/communication module 122, 172, respectively, coupled to an antenna 124, 174, respectively. Of course, multiple antennas may be employed to advantage. Also, the transceiver/communication module 122, 172 are configured for wireless and wired communication. The base station 120 and the another base station 170 may provide point-to-point and/or point-to-multipoint communication services. The base station 120 and the another base station 170 include a data processing and control unit 126, 176, respectively, formed with a processor 127, 177, respectively, coupled to a memory 128, 178, respectively. Of course, the base station 120 and the another base station 170 include other elements such as interface devices, etc.

The base station 120 and the another base station 170 may host functions such as radio resource management. For instance, the base station 120 and the another base station 170 may perform functions such as internet protocol ("IP") header compression and encryption of user data streams, ciphering of user data streams, radio bearer control, radio admission control, connection mobility control, dynamic allocation of communication resources to user equipment 110 and the another user equipment 180 in both the uplink and the downlink, and measurement and reporting configuration for mobility and scheduling.

The radio network controller 130 and the another radio network controller 160 are formed with a communication module 132, 162, respectively. The radio network controller 130 and the another radio network controller 160 include a data processing and control unit 136, 166, respectively, formed with a processor 137, 167, respectively, coupled to a memory 138, 168, respectively. Of course, the radio network controller 130 and the another radio network controller 160 include other elements such as interface devices, etc. The radio network controller 130 and the another radio network controller 160 generally provide access to a telecommunication network such as a public service telecommunications network ("PSTN"). Access may be provided using fiber optic, coaxial, twisted pair, microwave communications, or similar link coupled to an appropriate link-terminating element.

The server 140 and the another network server 150 are formed with a communication module, and data processing and control unit as described above. While a local fault detector typically resides in a communication node such as the user equipment 110 and the another user equipment 180, a global fault detector can reside in any one of the communication nodes of the communication system. In an ad hoc network wherein the user equipment 110 communicates to the another user equipment 180, the global detector may reside in one of the aforementioned communication nodes. Additionally, the global fault detector may reside in one of the network server 140 or the another network server 150. The position of the global fault detector and the fault estimation and localization system, in general, is not limited to any one communication node of the communication system.

The transceivers modulate information onto a carrier waveform for transmission by the respective communication element via the respective antenna(s) to another communication element. The respective transceiver demodulates information received via the antenna(s) for further processing by other communication elements. The transceiver is capable of supporting duplex operation for the respective communication element. The communication modules further facilitate the bidirectional transfer of information between communication elements.

The data processing and control units identified herein provide digital processing functions for controlling various operations required by the respective unit in which it operates, such as radio and data processing operations to conduct bidirectional wireless communications between radio network controllers and a respective user equipment coupled to the respective base station. The processors in the data processing and control units are each coupled to memory that stores programs and data of a temporary or more permanent nature.

The processors in the data processing and control units, which may be implemented with one or a plurality of processing devices, performs functions associated with its operation including, without limitation, precoding of antenna gain/phase parameters, encoding and decoding of individual bits forming a communication message, formatting of information and overall control of a respective communication element. Exemplary-functions related to management of communication resources include, without limitation, hardware installation, traffic management, performance data analysis, configuration management, security, billing and the like. The processors in the data processing and control units may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories in the data processing and control units may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memories may form a data buffer for data transmitted to and from the same. In the case of the user equipment, the memories may store applications (e.g., virus scan, browser and games) for use by the same. Exemplary embodiments of the system, subsystems, and modules as described herein may be implemented, at least in part, by computer software executable by processors of the data processing and control units, or by hardware, or by combinations thereof.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer info cation. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

Figure 2:
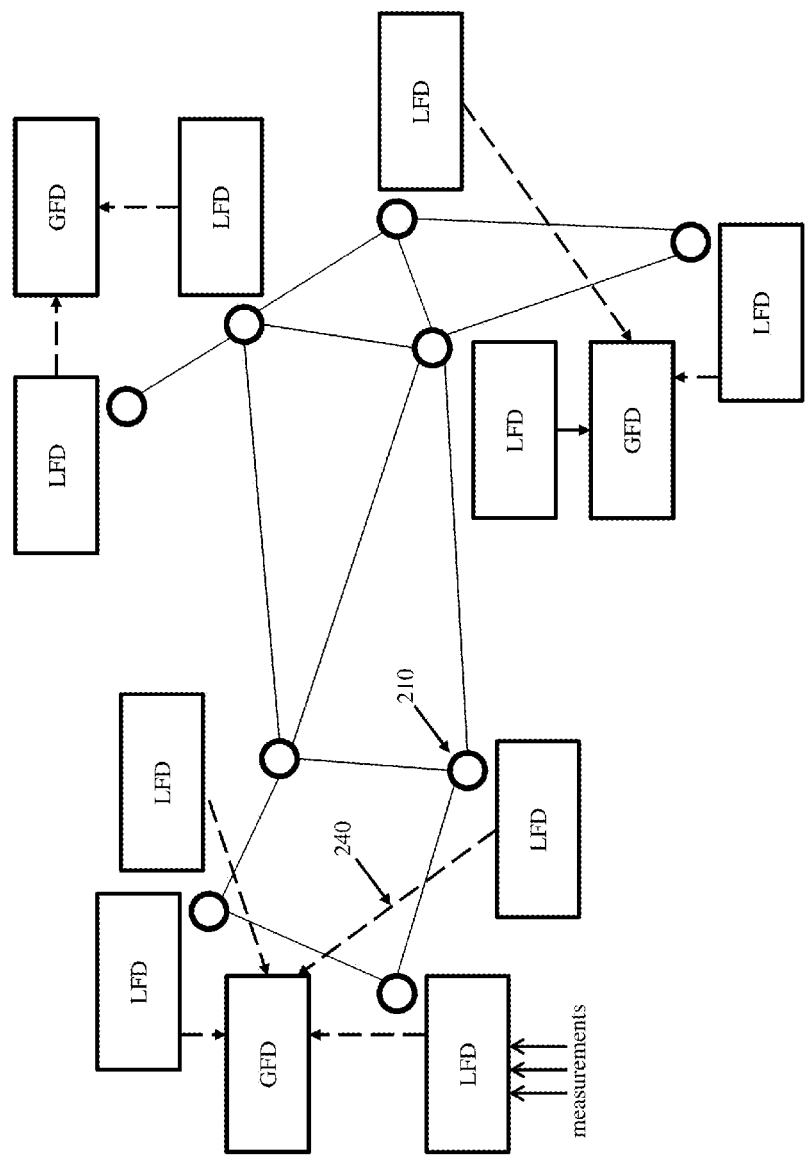
FIG. 2 illustrates a block diagram of an embodiment of a fault estimation and localization system.

Turning now to FIG. 2, illustrated is a block diagram of an embodiment of a fault estimation and localization system. Communication nodes of an ad hoc network are represented in FIG. 2 by circles (one of which is designated 210). Each communication node of the ad hoc network maintains a local fault detector ("LFD"). A local fault detector uses local information (i.e., information available at a local communication node) to assess the health of the network. Each local fault detector monitors a set of observable parameters as described hereinbelow and produces an estimated state of a number of faults or conditions of interest. In addition, the local fault detector is responsible for estimating the location of a detected fault as well. If a fault has been detected, it produces an estimate of distances to a set of known network peer communication nodes as well as an estimate of distance to the detected fault.

The architecture also includes a number of global fault detectors ("GFDs"). The global fault detectors can be viewed as a thin layer attached to the local fault detectors and are responsible for receiving fault estimation and localization information (e.g., a peer communication report 240) from the local fault detectors at peer communication nodes. Such peer communication reports are not required to be consistent or complete, thus allowing the fault estimation and localization system to function in adverse conditions. Additionally, this architecture is intrinsically un-centralized and robust, and carries low overhead. A middleware program such as digital repository authorization middleware architecture ("DRAMA") can be employed for a deployment choice for the exchange of messages between global and local fault detectors.

Figure 3:
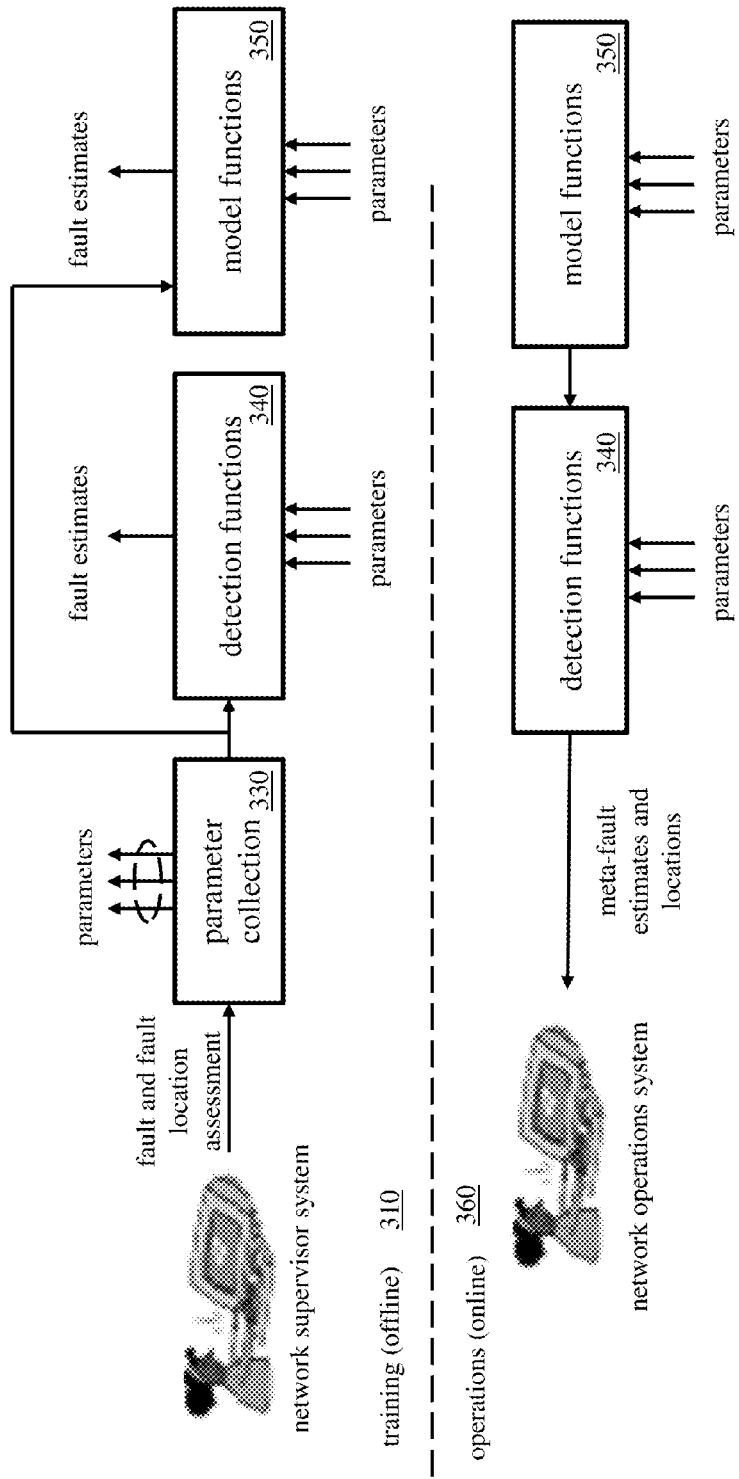
FIG. 3 illustrates a graphical representation illustrating an exemplary deployment lifecycle of a fault estimation and localization system.

Turning now to FIG. 3, illustrated is a graphical representation illustrating an exemplary deployment lifecycle of a fault estimation and localization system. The deployment lifecycle includes two main phases. One main phase is an offline training phase 310 that includes building a training set to identify network faults. A training set includes various network parameters or observations (also referred to as observable parameters) as described herein that are collected in a parameter collection module 330 to represent both normal behavior of the ad hoc network as well as faults for a detection function module 340 that identify fault estimates. The parameters can be collected either through running a local fault detector in a training mode for a specific period of time and/or by re-using, parsing and conditioning selected sections of log files generated during day-to-day operations of the network. A model function module 350 employs the parameters to identify the fault estimates.

A network supervisor system that is familiar with the operations of the network provides data labels to a set of parameters that represents a network fault state corresponding to particular data. The network supervisor system provides fault and fault location assessment during offline training. For example, if log files in a communication node indicate locally that an interface was rendered inoperational or faulty during a certain interval of time, the data corresponding to the same interval on other communication nodes can be marked as such. If network faults can be replicated, a local fault detector can be used for labeling the data directly with console input from the network supervisor system.

The model function(s) from the model function module 350 and/or the detection function(s) from the detection function module 340 are generated based on labeled data using supervised learning tools. Such functions can be tuned through an operator system (e.g., the network supervisor system) input to augment different aspects of fault detection and estimation.

In an online operations phase 360 of the deployment lifecycle, the local fault detectors employ the detection functions from the detection function module 340 and the model functions from the model function module 350 developed in the training phase to produce fault estimates such as meta-fault estimates and locations. These functions take in parameters or observations generated at runtime and outputs meta-fault estimates and locations to network operations system corresponding to the fault state of the network as well as distance to the fault. These reports are reported locally and are also be forwarded to a global fault detector.

An application network for the fault estimation and localization system is an ad hoc network that is in the early stages of roll out. An Internet protocol ("IP") layer of the network sits on top of a mobile network layer that is stacked upon a mobile link layer and a physical layer. The mobile link layer is responsible for performing a combined time division multiple access/orthogonal frequency division multiple access ("TDMA/OFDMA") functionality, including slot and channel assignment, collision detection and packet/frame transmission between nodes within radio range. The mobile network layer is responsible for packet routing and end-to-end (multi-hop) forwarding.

For simplicity of description it is assumed, without restriction, that the network is flat and that communication nodes are of the same type (i.e., there are no communication nodes with specific functionality not available to other communication nodes). While this assumption is not necessary for the system introduced herein, this assumption is employed to develop the same detection and estimation function for all the communication nodes in the network. Traces from all the communication nodes are accordingly combined in a training phase to achieve higher diversity of data, thereby increasing the amount of training data and accordingly improving the detection accuracy.

The fault estimation and localization system focuses on detection, estimation and localization of several types of faults. One type of fault is a general failure, which is also referred to herein as an interface failure. This is a failure of a radio device to operate. While this is a condition relatively easy to identify at the corresponding communication node, it is considerably harder to identify by other parties in an ad hoc network. Typical manifestations are session timeouts to the fault communication node and to other communication nodes, increased packet drops to other communication nodes due to re-routing, drop of links at mobile link layer, etc.

Another type of fault is an out-of-range partition of the network which is a network partition either by a single communication node or by multiple communication nodes due to communication node movement(s). It is challenging to distinguish between a general failure and an out-of-range partition. Distinction is important since remediation processes can be different for the two faults. An out-of-range partition fault is challenging to discriminate because the manifestations of the two faults are identical after onset of the fault. The onset for a general failure tends to be brisker, while the onset of the out-of-range partition tends to be slightly more gradual with higher bit-error-rates, packet drops and lower signal-to-noise ratio. This problem can be challenging even for model-based fault detection and estimation processes.

Congestion is a further type of fault. This is a condition in parts of the network wherein traffic exceeding an available bandwidth is pushed through selected communication nodes or links. This manifests itself through jittery packet reception, higher packet drops, increasing latencies, etc. Many symptoms are also shared with this fault, making congestion at times hard to discriminate. Localization of a congestion fault is usually harder to pinpoint, since entire areas of the network can be affected by this fault.

The inherently indistinguishable character of general failure and out-of-range partition faults makes the latter fault hard to detect from a remote location. The subtle manifestations of the onset of an out-of-range partition are usually masked by the mobile network in the Internet protocol and higher layers, and sometimes are only visible on very few communication nodes in the network. As a result, the detection of this fault is inherently global. To overcome this obstacle, two intermediate fault estimates (or meta-fault estimates) are employed from local fault detectors.

One meta-fault is a comprehensive failure. A comprehensive failure represents a network partition due to generic causes. It encompasses static manifestations of both a communication node failure and an out-of-range partition. Out-of-range communication node movement is another meta-fault. Out-of-range communication node movement represents a condition wherein a communication node moves out of range of another communication node regardless of whether the movement causes a network partition.

The introduction of these meta-faults still places the detection load on the local fault detectors while allowing a relatively straightforward mapping between the meta-faults and the other faults. An out-of-range movement meta-fault at the onset of a comprehensive failure meta-fault is mapped into an out-of-range partition, while the absence of the out-of-range movement meta-fault is mapped into a general failure. This mapping is carried out at a global fault detector, since the two meta-faults are often detected by different communication nodes, as described further hereinbelow.

For simplicity of the description, without limitation, it is assumed that at any given time there is at most one fault present in the network. While this may not be a reasonable assumption for real-life networks, processes described herein as well as their implementation do not preclude multiple, concomitant faults. In order to support multiple, simultaneous faults, a local fault detector can accommodate different fault locations, and training and evaluation under such conditions.

Figure 4:
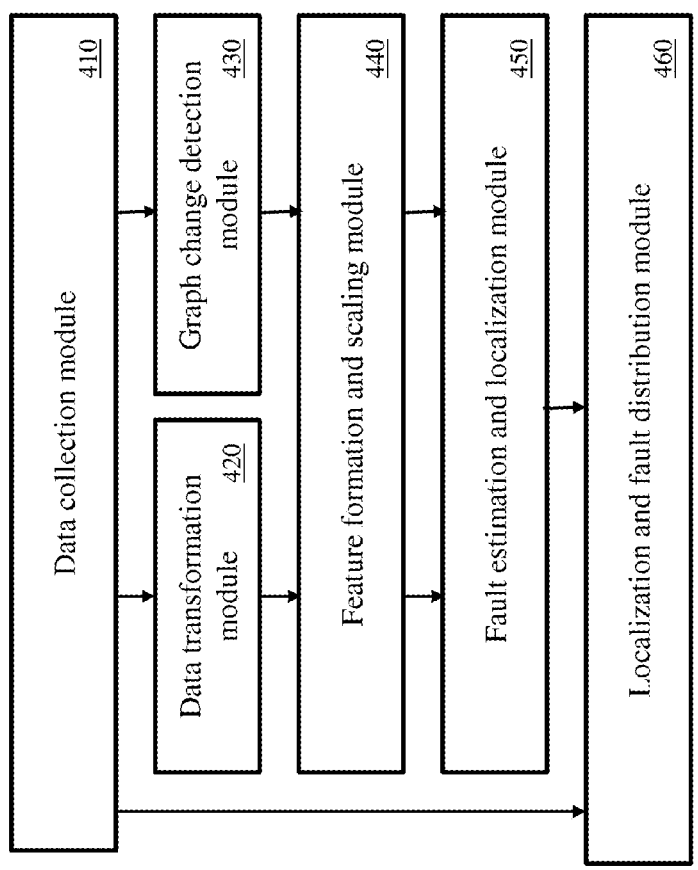
FIG. 4 illustrates a block diagram of an embodiment of a local fault detector.

Turning now to FIG. 4, illustrated is a block diagram of an embodiment of a local fault detector. The local fault detector may be operable on a data processing and control unit of a communication node such as the user equipment 110 and the another user equipment 180 of FIG. 1. The local fault detector receives parameters or observations (also referred to as observable parameters) from a local communication node and based thereon makes decisions about the state of the faults (e.g., meta-faults) and the location thereof.

A data collection module 410 collects the parameters and performs basic parsing and normalization. In an implementation, the data collection module 410 collects statistics at the link layer, at the mobile network layer, and at an application layer. The statistics (or communication statistics) include, without limitation, in, out and transit bytes and packets received or sent on the radio interface, and incoming and outgoing errors and packet drops, queue lengths for outgoing sending queues and signal-to-noise ratio ("SNR") measurements on a per-neighbor communication node basis available at mobile data link layer.

Latency measurements are made to peer communication nodes throughout the network. In an implementation, each communication node maintains sessions with no more than "m" nodes, where m≤n/3, where "n" is the number of communication nodes of the network. The session duration varies between 50 and 150 seconds, which emulates the short-flow sessions that are often encountered in a network. In real life, these measurements can be collected in IP tables or by packet capture ("PCAP") filters deployed on the communication node without generating any additional traffic for this purpose. Excepting latency measurements, other parameters are obtained through simple network management protocol ("SNMP") from different network layers at the radio host. The measurements may be sampled every five seconds.

A data transformation module 420 enables the local fault detector to operate independent of the actual topology and deployment scenario. The data transformation module 420 abstracts and synthesizes topology-dependent information. More concretely for SNR and latency, the measurements reflect information about certain peers and neighbor communication nodes. The measurements are fragile with respect to topology changes and mission advances. In order to filter out such information, statistical transformation on both latency and SNR data are retained (e.g., min, max, median, average and cardinality) across peers/link neighbor communication nodes as well as peer communication node stability between consecutive measurements.

A graph change detection module 430 attempts to statistically detect significant changes in the underlying data, which are changes that might be indicative of faults. This graph change detection module 430 functions as peer-based communication node measurements are mapped into an abstract weighted graph. For successive measurements, the distance between successive graphs subject to a specific graph metric (e.g., the diameter) are computed. Significant changes in this time series of the network graph are found through cumulative summation. The graph change detection module 430 represents a process for digesting peer-based communication node information into scalars that are highly indicative of fault conditions.

A feature formation and scaling module 440 takes the transformed parameters into numerical features appropriate for a fault estimation and localization module 450. An aspect of the feature formation and scaling module 440 is maintenance of a history for a subset of the transformed parameters. Currently, SNR-based measurements are maintained over a period of 30 seconds, while selected latency statistics (min, 2-min, max, 2-max) are maintained for a period of two minutes. The presence of short-term history in the data available for learning and for detection is useful to determine trends, which are indicative of faults. In the aforementioned relationship, "min" and "2-min" represent a minimum and second minimum latency, respectively, between peer communication nodes and "max" and "2-max" represent a maximum and second maximum latency, respectively, between peer communication nodes.

The feature formation and scaling module 440 normalizes the data into scalars in the interval 0-1 based on a priori known values about the effective range (e.g., a maximum and effective range) of each parameter. The scaling section is useful when applying a model learned in a network of a given size to a network of a different size, given that the range of many parameters may vary with network size. This section allows the process to be robust to account for changes in network size. Given the above sets of parameters and the maintained history, the feature set from the feature formation and scaling module 440 includes of a number of scalars, such as 55 scalars, that constitute input for the fault estimation and localization module 450.

The fault estimation and localization module 450 represents a set of SVM-based detection functions (or models)

derived through training on the set of labeled features. The fault estimation and localization module 450 employs a function corresponding to each of the meta-faults and another function corresponding to each of the distances to meta-fault location. In an embodiment, a total of six detection functions are employed. While many models can be defined as less complex (e.g., binary, classification problem (0/1)), an out-of-range communication node move model can be defined as a multi-class classification problem to boost discrimination between out of range and comprehensive failures to the detriment of non-faulty states.

In a training phase, the support vector machines can be trained using a radial basis function ("REF") or a Gaussian kernel, and the free parameters can be tuned using five-fold cross-validation. The cross-validation is a technique for model selection using training data alone. In this technique, given training data is partitioned into a number "N" partitions of roughly equal size. For a given choice of free parameter(s), the learning fault process is trained on all but one of the partitions, which is used for evaluating the performance of learning. This process is repeated "N" times, each time testing the performance on a different partition. The average performance over "N" different testing partitions is regarded as the performance for the chosen values of free parameters. The choice-free parameter values that yield acceptable (e.g., the best) performance are then selected for training the learning fault process with the entire training data, and the resulting learning model is used during online operations.

The fault estimation and localization functions (employed by the fault estimation and localization module 450) learned by SVM are mathematical functions that depend on inner products (dot products) between feature vectors from the training data and the feature vector for the current measurements. Such feature vectors in the training data are determined at the training stage, and are usually a small fraction of the training data set. The inner products are then weighted by coefficients which have also been determined during training and summed up, and a threshold (e.g., a −0.5 threshold produces a +/−1 decision) is applied to obtain a decision about the state of the network. In summary, the decision functions are simple and fast, as they involve basic mathematical operations.

A localization and fault distribution module 460 estimates distances to other communication nodes according to a metric of choice. The process for predicting distances to faults can use any number of metrics for estimating distances, provided that an analogous process was used during training and labeling when assessing the actual distance to the fault location, and provided that the distance has a correspondence or bearing in the parameters. For example, one-hop communication node neighbors, latencies, SNR values and signal strength can be used for such estimation. In an embodiment, a one-hop communication node neighbor and latency can be used to estimate distances to a subset of the communication nodes. This information is used later at a global fault detector in conjunction with a fault distance to assess the set of communication nodes that might be estimated to be in a fault footprint. Note that this approach permits an estimation of the location of a fault even when partial information is available for making such a decision, which most often is the case when a fault is present in the network. Local fault detection and estimation can be implemented in hardware, software (e.g., in both Java and C programming languages using a library such as the LIBSVM library), or combinations thereof, for implementing the local fault detector.

Figure 5:
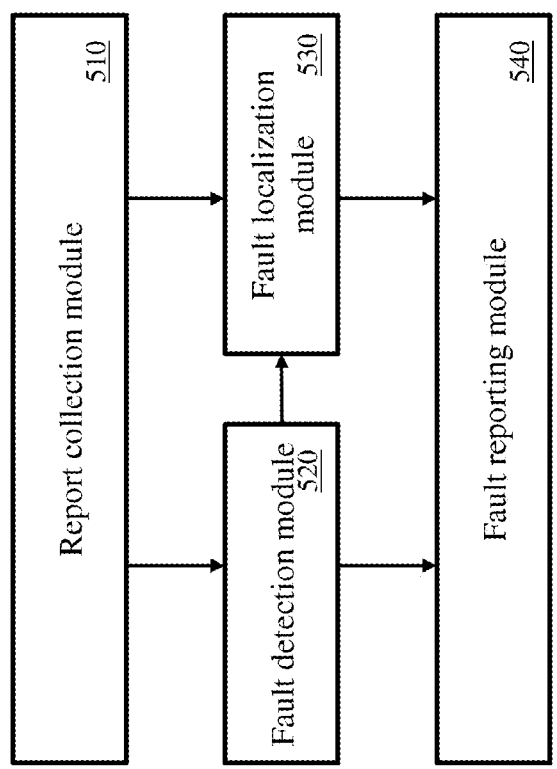
FIG. 5 illustrates a block diagram of an embodiment of a global fault detector.

Turning now to FIG. 5, illustrated is a block diagram of an embodiment of a global fault detector. The global fault detector may be operable on a data processing and control unit of a communication node such as the user equipment 110 and the another user equipment 180 of FIG. 1. A global fault detector is designed to be less complex in both computation capabilities and the role it plays in general detection of faults. The global fault detector operates on inherently partial data, thus making it suitable for robust and autonomous operations in ad hoc networks.

A report collection module 510 receives reports from a (sub)set of communication nodes. These reports contain both meta-fault state information as well as distance estimations to peer communication nodes and detected distances to faults. A fault detection module 520 aggregates meta-fault estimations. The fault detection module 520 performs filtering of transitory meta-faults (e.g., lasting less than 15 seconds) for reducing the rate of false positives. An out-of-range communication node movement meta-fault, trailed by a comprehensive failure meta-fault is interpreted as an out-of-range partition, while a plain comprehensive failure meta-fault is interpreted as a general failure. A congestion meta-fault is interpreted directly as a congestion fault.

A fault localization module 530 computes the set of communication nodes that can be potential fault location based on their known distances and the distance to the fault in reports from a local fault detector. Potential fault communication nodes thus accumulate votes across reports from different communication nodes and across time, leading to communication nodes getting ranked according to their likelihood of being a fault location. In an embodiment, the output of the fault localization module 530 includes the communication node most likely to be the location, the set of 25 percent of the communication nodes that are most likely to be the footprint of the fault, and the set of 50 percent of the communication nodes that are likely to be the footprint of the fault. Thus, the global fault detector combines fault estimates from local fault detectors to produce a meta-fault estimate by using selected fault estimates from the local fault detectors over time and ranking the selected fault estimates according to a likelihood that a respective communication node is the fault location. A fault reporting module 540 presents the fault state and fault location to a network operator system (at a network communication node).

Figure 6:
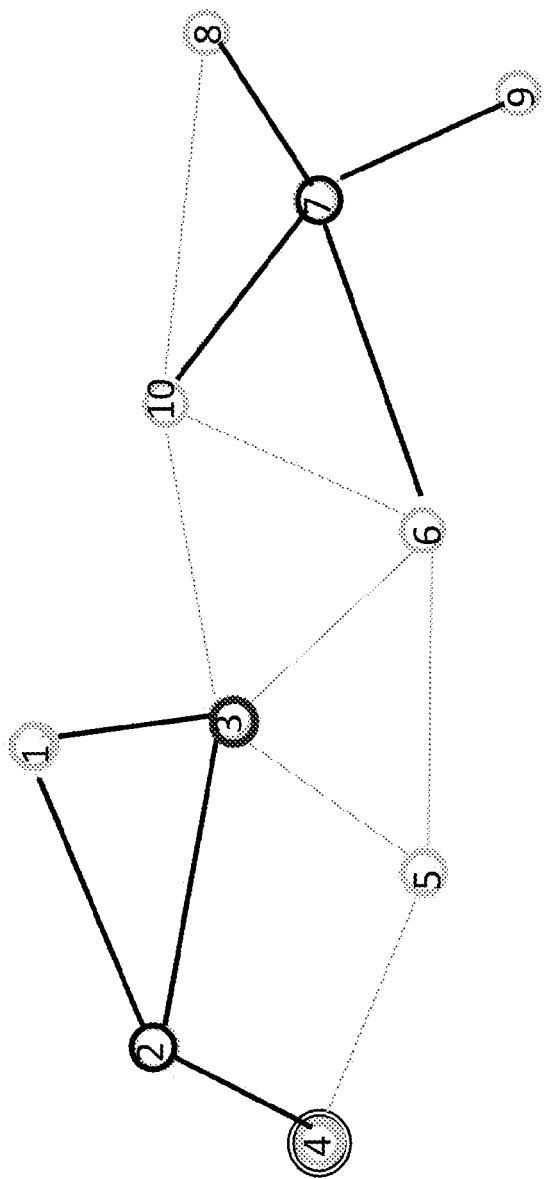
FIG. 6 illustrates a system level diagram of an embodiment of a method of operating a fault estimation and localization system.

Turning now to FIG. 6, illustrated is a system level diagram of an embodiment of a method of operating a fault estimation and localization system. A communication system includes a plurality of communication nodes (designated 1 to 10) in an ad hoc network. A global fault detector (e.g., resident in communication node 5) operates on fault estimates and topology reports (or peer communication reports) from local fault detectors (e.g., from communication nodes 1, 2, 3, 4). The global fault detector incrementally constructs a partial topology from topology reports. Each reporting local fault detector sends its local topology information to the global fault detector (e.g., one or two hop neighbor communication nodes).

The global fault detector aggregates a number of such reports and constructs a partial topology (such as illustrated in FIG. 6). From the reports from the local fault detectors, the global fault detector infers a likely fault location. Additionally, the reports from the local fault detectors include relative fault locations. For instance, the reports from the communication nodes 1 and 2 provide that a fault (or estimate thereof) has occurred at a relative location of one-hop away. From the fault location inferred by the global fault detector and the reports from the local fault detectors, the global fault detector estimates the location of the fault. For instance, the global fault detector infers that communication nodes 2, 3 and communication nodes 1, 3, 4 are potential locations for the faults, thus determines that communication node 3 is most likely to be the location of the fault. The multiple reports consolidate the confidence of a fault estimate and increase the precision of the fault location.

For the purposes of an example, a fault estimation and localization system was trained and evaluated on a virtual ad hoc network test bed using a simulated network formed of eight communication nodes. Eight instances of a local fault detector were executed in eight separate virtual machines that communicated over a simulated ad hoc network.

The training data set included more than six hours of execution time, with samples of the observable parameters taken every five seconds yielding more than 4000 observation samples for each of the eight communication nodes. The detection models were developed using the parameters taken from each of the eight communication nodes, thus incorporating the experience of the communication nodes to the equivalent of more than 48 communication node-hours of execution. The training set incorporated a representative set of background traffic, a mix of communication node movement, and network reconfiguration.

TABLE 1

| Training Set | No of faults | Percentage of Data | Min Fault Duration (s) | Max Fault Duration (s) |
|---|---|---|---|---|
| General Failure | 36 | 11.6% | 35 | 210 |
| Out of Range Partition | 24 | 12.6% | 45 | 290 |
| Congestion | 40 | 11.2% | 25 | 24 |
| No Fault State | 103 | 64.6% | 25 | 970 |

TABLE 1 above shows the mix of faults (or estimates thereof) used for training, along with the duration of each of the fault states. It can be seen that the training data set was biased towards non-faulty states, as this is the dominant state of the network.

To evaluate performance of the fault estimation and localization system, the system was deployed on the same eight-communication node network, but using different communication node movements, traffic and fault distribution. The network was evaluated on a total of more than seven hours of execution time with samples of the observable parameters taken every five seconds yielding more than 5000 observation samples for each of the eight communication nodes.

In order to quantify changes in topology during evaluation, the following topology metrics were employed. A maximum path length represents the longest path between any two communication nodes in the network (also called network diameter). An average path length represents a path length between any two communication nodes averaged across all of the communication nodes. A maximum connectivity represents a maximum number of links of each communication node. An average connectivity represents a number of links each communication node has averaged across all of the communication nodes. Stability measures the difference between two topologies, usually a given topology and a reference topology. The stability is defined as sum $(\mod(LC_{ij}-LR_{ij}))$, where $LC_{ij}$ is the cost of the link between communication nodes i and j in the current topology, and $LR_{ij}$ is the cost of the link between communication nodes i and j in the reference topology. The link cost $LC_{ij\,=\{0,\,1\}}$ was used in the computation. A larger number signifies a topology that departs more significantly from the reference topology. TABLE 2 below shows the mix of faults (or estimates thereof) used during the evaluation, their incidence, as well as durations.

TABLE 2

Fault Representation in Evaluation Data Set

| Evaluation Set | No of faults | Percentage of Data | Min Fault Duration (s) | Max Fault Duration (s) |
|---|---|---|---|---|
| General Failure | 28 | 5.2% | 40 | 550 |
| Out of Range Partition | 22 | 10.3% | 50 | 315 |
| Congestion | 19 | 4.5% | 25 | 180 |
| No Fault State | 70 | 80% | 65 | 1260 |

In order to assess the feasibility of the fault estimation and localization system, measurements attempt to measure the accuracy of the process both at the local level and at the global level. The following metrics were used to this end. A detection rate represents the ratio between the number of faults that were detected, and the number of faults that have actually occurred. The detection rate can be computed on a per-fault basis, or on a per-sample basis. For the purpose of this evaluation, a fault is considered to be detected if it has been properly identify for a majority of time when the fault was in effect. For the sample-wise metric, all of the samples that are detected correctly fare in the computation of the metric. The detection rate can be computed at both local and global level. A misclassification rate "f" for a fault represents the ratio of the number of faults that were identified as other than "f" while fault "f" took place, to the total number of faults of type "f." Similar to the above metric, the misclassification rate can be computed on a fault basis or on a per-sample basis. This metric tells how well the system discriminates between faults.

Additional metrics include a false negative rate (miss rate) representing the ratio of the number of occurrences when a fault was in effect, but it was not detected at all, to the total number of faults of that type. This metric shows the ability of the system to find a fault, regardless of how it was classified. A false positive ratio represents the ratio between the number of detected fault states that occurred during a non-faulty state, and the total number of actual faulty states. This metric supplements the detection rate metric by showing how well the process detects non-faulty states. Note that the false positive ratio can be supra-unitary if the number of falsely detected faults is greater than the number of actual faults in that data set. When the false positive ratio is computed sample-wise, it accounts for all the observations detected as faults when a fault was not in effect divided by the total number of observations taken when that fault type has occurred. When the false positive ratio is computed fault-wise, the samples are grouped into faults as contiguous blocks of detected samples. Note that this metric is not computed relative to the number of non-faulty states, which in our evaluations is a much larger number.

Additional metrics include a maximum detection delay representing the duration of time between the moment a fault has occurred and the moment the fault has been first detected. This metric indicates how fast the system detects a fault. A maximum detection lag represents the duration of time between the moment a fault has ceased to manifest and the moment its detection stopped. This metric indicates how well the method detects the moment a fault has ended.

The following metrics assess how accurately the location of a fault was detected. A localization rate represents the ratio of the number of times a fault location had been identified correctly to the number of times the fault had been identified. This metric is computed on a per-fault basis. A correct identification is assumed when a communication node had been identified as the cause of the fault for a majority of samples during a particular occurrence of that fault. A localization 25 percent rate represents the ratio of the number of times a fault location had been identified correctly in the 25 percent set to the number of times the fault had been identified. This metric is computed on a per-fault basis. A correct identification is assumed when a communication node had been identified as the cause of the fault for a majority of samples during a particular occurrence of that fault. A localization 50 percent rate is similar to the metric above, but assumes a correct identification when a communication node appears in the 50 percent set computed by the fault localizer.

TABLE 3 below shows the accuracy of the local fault detector with respect to estimating the correct type of faults. In order to compute these results, the corresponding rates were averaged across all the eight communication nodes.

TABLE 3

Local Fault Detector Evaluation

| LFD Results | Detection Rate (fault-wise) | Detection Rate (sample-wise) | False Positive Ratio (fault-wise) | False Positive Ratio (sample-wise) |
|---|---|---|---|---|
| Comprehensive Failure | 41% | 62% | 53% | 39% |
| Out Of Range Movement | 91% | 91% | 11% | 11% |
| Congestion | 39% | 55% | 51% | 22% |
| No Fault State | — | 69% | — | — |

It can be observed that the detection rate for comprehensive failure is 41 percent in a fault-wise measure. This implies that only in 41 percent of the cases a comprehensive failure had been detected for a majority of observations. This can be empirically attributed to the fact that a communication node can more reliably perceive the comprehensive failure of another communication node if latency measurements are available to that communication node. This rate intuitively corresponds to the average number of sessions maintained to the other communication nodes.

The sample-wise detection rate is significantly higher. The discrepancy can be attributed to the fact that small duration faults were often not detected (i.e., the longer a fault has occurred, the better chance of its detection). The false positive ratio is large (half as many comprehensive failures were falsely attributed when no fault has occurred). The smaller sample-wise false positive ratio shows that most of the false positives were short lived and could be curtailed by a low-pass filter on the output of the local fault detector.

The out of range movement detection rate is very high, indicating that a communication node can reliably identify that another communication node departed its transmission range. The small false positive rate shows that this indicator can rarely be attributed to another condition, such as the comprehensive failure, or to no fault. The detection of congestion is roughly as accurate as the detection of the comprehensive failure. This suggests, again, that the results are derived from latency/flow measurements. From a no-fault state perspective, its accuracy is higher, and by filtering out transient faults, this may be considered even higher.

The fault-wise detection rate represents the ratio of the number of faults that were detected for the entire, or part of (more than four samples) the time period where the faults have occurred, to the total number of faults that have actually occurred. The overall performance results of the local fault detector suggest that while it provides a strong hint of when a fault has occurred, its output can be improved.

In order to augment the local fault detection, a global fault detector performs a simple combination of reports (or peer communication reports) from local fault detectors. While the combination is designed to improve fault detection rate by incorporating the view of multiple communication nodes, the high fault positive rate is addressed by both filtering out transient faults lasting no longer than three samples, and by employing a concurrent decision for fault initiation. TABLE 4 below presents accuracy measurements thus obtained for the global fault detector. The fault-wise detection rate for each type of fault is greatly improved to 79 percent, 73 percent, and 100 percent, respectively, with an overall detection rate of 83 percent.

TABLE 4

Global Fault Detector Results

| GFD Results | Detection Rate (fault-wise) | Mis-classification Rate (fault-wise) | False Negative Rate (fault-wise) | False Positive Ratio With Filtering (fault-wise) | False Positive Ratio Without Filtering (fault-wise) | Max Detection Delay (s) | Max Detection Lag (s) |
|---|---|---|---|---|---|---|---|
| General Failure | 79% | 14% | 7% | 7% | 21% | 30 | 20 |
| Out Of Range Partition | 73% | 27% | 0% | 22% | 40% | 30 | 50 |
| Congestion | 100% | 0% | 0% | 10% | 57% | 25 | 25 |
| Overall | 83% | 14% | 3% | 13% | 37% | 30 | 50 |

The misclassification rate between general failure and out-of-range partition faults is still significant at 14 percent and 27 percent, respectively. Although the out-of-range movement indicator reported by the local fault detector is reliable, the timing of this indicator with the detection of comprehensive failure indicator may be less than ideal. The majority of misclassifications are due to the timing of these indicators outside of the same detection window configured at 30 seconds.

The possibility of false negatives is greatly reduced, but it is still possible for general failures (7 percent), especially in the case of short lived faults. The fault-wise false positive ratio remains pretty high if no filtering measure is applied. If transitory faults are eliminated (no more than three consecutive samples), the false positive rate drops to 7 percent, 22 percent, and 10 percent, respectively, with an overall rate of 13 percent. Thus, the above techniques produce a general hit rate of 97 percent, with a 13 percent false positive ratio and 14 percent misclassification rate. The detection delay varies between 0 and 30 seconds, slightly lower for congestion, while the lag varies between 0 and 50 seconds, larger for out-of range partition. This could be explained through labeling imprecision (i.e., when to declare that a communication node is actually out of range), which is inherent for this type of fault.

TABLE 5 below presents the results of precision evaluation for the fault estimation and localization system. The localization procedure was performed for every detected fault, including the misclassified states, thus covering 97 percent of the faults. Since localization decisions can vary throughout the lifetime of a fault instance, the target communication node is chosen via a plurality count across the lifetime of the fault instance. The localization rate measured on the evaluation set was 64 percent, 45 percent and 57 percent, respectively, with an overall detection rate of 58 percent across all the faults. The localization 25 percent rate is significantly higher, providing a rate between 75 percent and 80 percent, of which the source of the fault being pinpointed as one of the two reported communication nodes (8 times 25 percent). The localization 50 percent is even higher, with an overall rate of 92 percent, signifying that any one of the four communication nodes could be the case of the fault.

TABLE 5

Fault Estimation and Localization Results

| Fault Localization Results | Localization Rate | Localization 25% Rate | Localization 50% Rate |
|---|---|---|---|
| General Failure | 64% | 75% | 82% |
| Out Of Range Partition | 45% | 77% | 95% |
| Congestion | 57% | 78% | 94% |
| Overall | 58% | 79% | 92% |

The accuracy at both the local and global fault detectors suggests that increased fault detection and estimation can be achieved even when at least a limited number of communication nodes are collaborating in assessing the problem. This can offer a significant advantage when devising an efficient, but robust system for data exchange for monitoring the health of an ad hoc network.

As a learning-based system, a fault estimation and localization system for ad hoc networks has thus been introduced. The fault estimation and localization system can avoid model fragility by employing learning techniques wherein normal behavior of an ad hoc network, as well as typical manifestations of faults, are learned and automatically condensed into accurate fault models without reliance on minute understanding of network characteristics. The fault estimation and localization system uses a combined local and global architecture wherein main detection and estimation functionality takes place at substantially every communication node in the network based on local information, and a thin global detection layer reconciles faults and locations. This architecture conserves bandwidth as no large amounts of measurements are hauled through the network. The process is robust, as the global layer can operate on limited and partial data. It can operate in a decentralized manner as the reconciliation can take place at many points throughout the network. Evaluation results show that the accuracy of the method is good, even with a limited training set.

Figure 7:
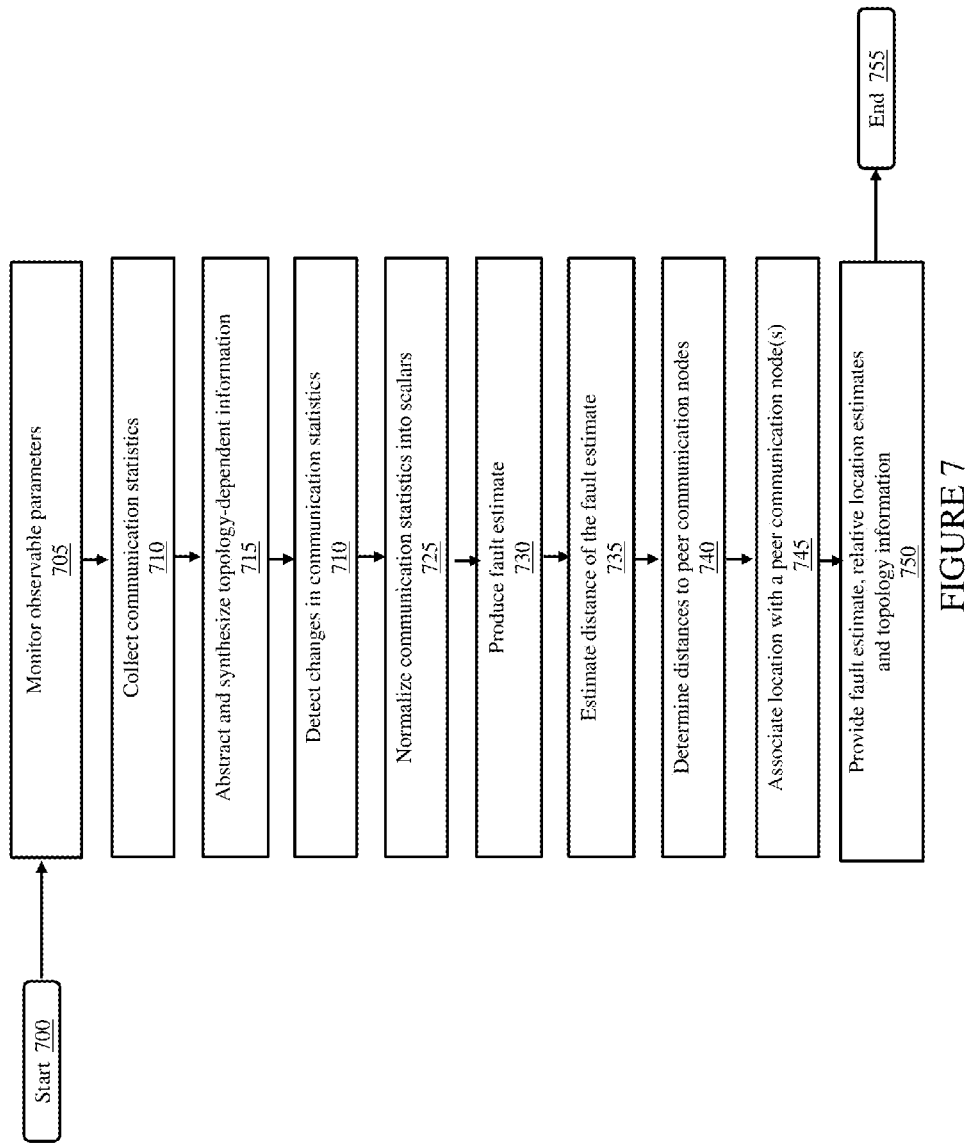
FIG. 7 illustrates a flow diagram of an embodiment of a method of estimating faults at a communication node in an ad hoc network.

Turning now to FIG. 7, illustrated is a flow diagram of an embodiment of a method of estimating faults at a communication node in an ad hoc network. The method begins in a start step or module 700. At a step or module 705, a set of observable parameters at the communication node are monitored. At a step or module 710, communication statistics are collected at a link layer of the communication node. At a step or module 715, topology-dependent information for the communication statistics is abstracted and synthesized. At a step or module 720, changes in the communication statistics indicative of a fault estimate are detected. At a step or module 725, the communication statistics are normalized into scalars over an interval. In an embodiment, the interval is a range from zero to one. In an embodiment, normalizing the communication statistics into scalars over the interval is based on respective values of a selected range of the communication statistics. In an embodiment, the communication statistics are incoming and outgoing packets received or sent on a radio interface of the communication node, queue lengths for outgoing sending queues, and/or signal-to-noise ratio measurements associated with peer communication nodes.

At a step or module 730, a fault estimate at the communication node is produced from the set of observable parameters and other information. In an embodiment the fault estimate is conditioned with off-line training. In an embodiment, the fault estimate is a meta-fault estimate including a comprehensive failure, an out-of-range communication node movement of a peer communication node, or congestion of the peer communication node. At a step or module 735, a distance of the fault estimate is estimated from the communication node. At a step or module 740, distances of the communication node to peer communication nodes are determined. At step or module 745, the location for the fault estimate is associated with at least one of the peer communication nodes. At a step or module 750, the fault estimate, the relative location estimates, and/or topology information are provided to a global fault detector at another communication node (e.g., in the ad hoc network). The method ends at step or module 755.

Figure 8:
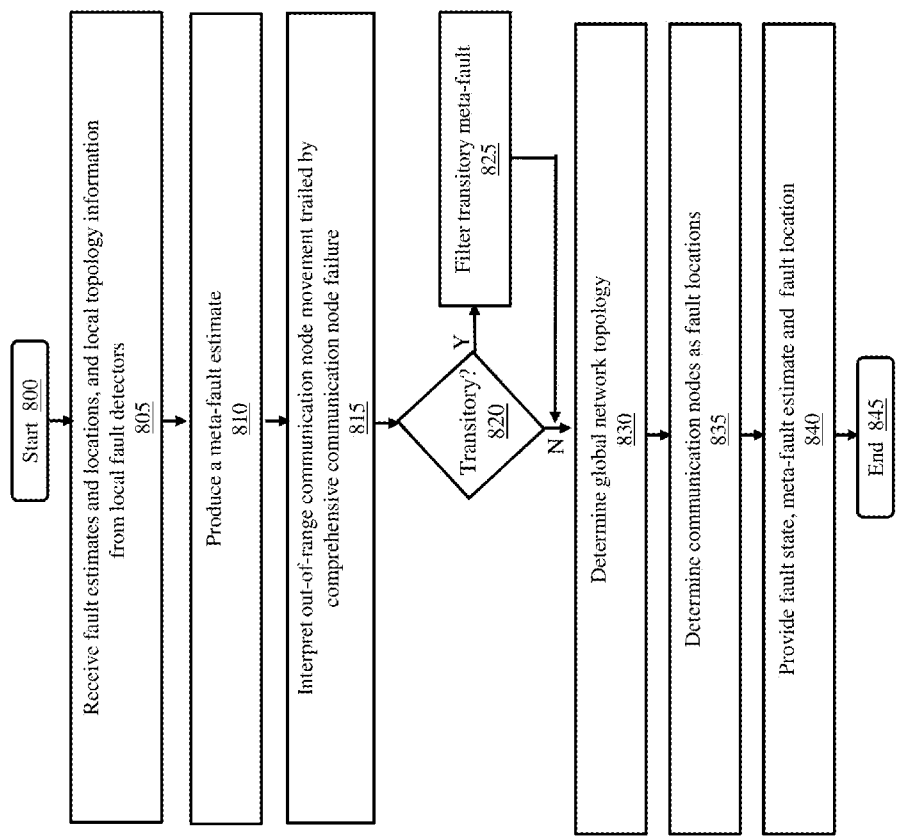
FIG. 8 illustrates a flow diagram of another embodiment of a method of estimating faults in an ad hoc network.

Turning now to FIG. 8, illustrated is a flow diagram of an embodiment of a method of estimating faults in an ad hoc network. The method begins in a start step or module 800. At a step or module 805, fault estimates and locations, and local topology information from local fault detectors are received at respective communication nodes in the ad hoc network. At a step or module 810, an out-of-range communication node movement trailed by a comprehensive communication node failure is interpreted as an out-of-range partition of the network. At a step or module 810, a meta-fault estimate is produced from at least ones of the fault estimates.

In an embodiment, the meta-fault estimate includes an out-of-range communication node movement, a comprehensive communication node failure, and/or congestion of another communication node. In another embodiment, the fault estimates are combined to produce the meta-fault estimate. The fault estimates are combined to produce the meta-fault estimate by using selected fault estimates from the local fault detectors over time, and ranking the selected fault estimates according to a likelihood that a respective communication node is the fault location.

At a decisional step or module 820, it is determined if the meta-fault is a transitory meta-fault. If the meta-fault is a transitory meta-fault, at a step of module 825, the transitory meta-fault is filtered and the method continues to step or module 830. In an embodiment, the meta-fault estimate is an estimate for a transitory meta-fault lasting less than about 15 seconds. Otherwise, at the step or module 830, a global network topology is determined from the local topology information. Thereafter, at a step 835, communication nodes are determined as fault locations for the meta-fault estimate as a function of location estimates and the global network topology. At a step or module 840, a fault state, the meta-fault estimate with associated fault locations are provided to a network communication node. The method ends at step or module 845.

Thus, as introduced herein, a communication node in an ad hoc network is configured to detect faults. In an environment of a communication node (see, e.g., FIG. 1), the communication node includes a processor in accordance with a memory configured to monitor a set of observable parameters at the communication node, collect communication statistics at a link layer of the communication node, abstract and synthesize topology-dependent information for the communication statistics, detect changes in the communication statistics indicative of a fault estimate, and normalize the communication statistics into scalars over an interval (e.g., over a range of 0 to 1) based on respective values of a selected range of the communication statistics. The communication statistics may include incoming and outgoing packets received or sent on a radio interface of the communication node, queue lengths for outgoing sending queues, or signal-to-noise ratio measurements associated with peer communication nodes.

The processor in accordance with the memory is also configured to produce a fault estimate at the communication node from the set of observable parameters. The fault estimate may be conditioned with off-line training. The fault estimate may be a meta-fault estimate comprising a comprehensive failure, an out-of-range communication node movement of a peer communication node or congestion of the peer communication node. The processor in accordance with the memory is also configured to estimate a distance of the fault estimate from the communication node, determine distances of the communication node to peer communication nodes, and associate a location for the fault estimate (a relative location estimate) with at least one of the peer communication nodes. The processor in accordance with the memory is also configured to provide the fault estimate, the relative location estimates and topology information to a global fault detector at another communication node (e.g., in the ad hoc network).

In another aspect and in an environment of a communication node (see, e.g., FIG. 1), the communication node includes a processor in accordance with a memory configured to receive fault estimates and locations, and local topology information from local fault detectors at respective communication nodes in a mobile ad hoc network. In accordance therewith, an out-of-range communication node movement trailed by a comprehensive communication node failure is interpreted as an out-of-range partition of the network. The processor in accordance with the memory is also configured to produce a meta-fault estimate from at least ones of the fault estimates.

In an embodiment, the meta-fault estimate includes an out-of-range communication node movement, a comprehensive communication node failure, and/or congestion of another communication node. In another embodiment, the fault estimates are combined to produce the meta-fault estimate. The fault estimates are combined to produce the meta-fault estimate by using selected fault estimates from the local fault detectors over time, and ranking the selected fault estimates according to a likelihood that a respective communication node is the fault location.

The processor in accordance with the memory is also configured to determine if the meta-fault estimate is a transitory meta-fault (e.g., a meta-fault lasting less than about 15 seconds) and, if so, filter the transitory meta-fault estimate. The processor in accordance with the memory is also configured to determine a global network topology from the local topology information. The processor in accordance with the memory is also configured to determine communication nodes as fault locations for the meta-fault estimate (e.g., based on global network topology) and provide a fault state and the meta-fault estimate with associated fault locations to a network communication node.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method operable at a communication node in a mobile ad hoc network, comprising: monitoring a set of observable parameters at said communication node;
   producing a fault estimate at a local fault detector at said communication node from said set of observable parameters;
   estimating a distance of said fault estimate from said communication node;
   determining distances of said communication node to peer communication nodes;
   associating a location for said fault estimate with at least one of said peer communication nodes based on said distance of said fault estimate from said communication node; and
   providing said fault estimate to a global fault detector at another communication node.

2. The method as recited in claim 1 wherein said fault estimate is conditioned with off-line training.

3. The method as recited in claim 1, further comprising:
   collecting communication statistics at a link layer of said communication node;
   abstracting and synthesizing topology-dependent information for said communication statistics;
   detecting changes in said communication statistics indicative of said fault estimate; and normalizing said communication statistics into scalars over an interval.

4. The method as recited in claim 3 wherein said communication statistics comprise:
   incoming and outgoing packets received or sent on a radio interface of said communication node;
   queue lengths for outgoing sending queues; and
   signal-to-noise ratio measurements associated with said peer communication nodes.

5. The method as recited in claim 3 wherein normalizing said communication statistics into said scalars over said interval is based on respective values of a selected range of said communication statistics.

6. The method as recited in claim 1 wherein said fault estimate is a meta-fault estimate comprising a comprehensive communication node failure, an out-of-range communication node movement of at least one of said peer communication nodes or congestion of at least one of said peer communication nodes.

7. A communication node, comprising:
   a processor; and
   memory including computer program code, said memory and said computer program code configured to, with said processor, cause said communication node to perform at least the following:
   monitor a set of observable parameters at said communication node;
   produce a fault estimate at a local fault detector at said communication node from said set of observable parameters;
   estimate a distance of said fault estimate from said communication node;
   determine distances of said communication node to peer communication nodes;
   associate a location for said fault estimate with at least one of said peer communication nodes based on said distance of said fault estimate from said communication node; and
   provide said fault estimate to a global fault detector at another communication node.

8. The communication node as recited in claim 7 wherein said memory and said computer program code are further configured to, with said processor, cause said communication node to condition said fault estimate with off-line training.

9. The communication node as recited in claim 7 wherein said memory and said computer program code are further configured to, with said processor, cause said communication node to:
   collect communication statistics at a link layer of said communication node;
   abstract and synthesize topology-dependent information for said communication statistics;
   detect changes in said communication statistics indicative of said fault estimate; and normalize said communication statistics into scalars over an interval.

10. The communication node as recited in claim 9 wherein said communication statistics comprise:
    incoming and outgoing packets received or sent on a radio interface of said communication node;
    queue lengths for outgoing sending queues; and
    signal-to-noise ratio measurements associated with said peer communication nodes.

11. The communication node as recited in claim 9 wherein said memory and said computer program code are further configured to, with said processor, cause said communication node to normalize said communication statistics into said scalars over said interval based on respective values of a selected range of said communication statistics.

12. The communication node as recited in claim 7 wherein said fault estimate is a meta-fault estimate comprising a comprehensive communication node failure, an out-of-range communication node movement of at least one of said peer communication nodes or congestion of at least one of said peer communication nodes.

13. A method operable in a mobile ad hoc network, comprising:
    receiving fault estimates from local fault detectors at respective communication nodes in said mobile ad hoc network, a location of each of said fault estimates being associated with at least one of respective peer communication nodes based on a distance of each of said fault estimates from said respective communication nodes;
    producing a meta-fault estimate at a global fault detector from at least ones of said fault estimates; and
    determining communication nodes as fault locations for said meta-fault estimate.

14. The method as recited in claim 13 further comprising providing a fault state and said meta-fault estimate with associated fault locations to a network communication node.

15. The method as recited in claim 13 wherein said meta-fault estimate comprises an out-of-range communication node movement, a comprehensive communication node failure or congestion of another communication node.

16. The method as recited in claim 15 further comprising interpreting said out-of-range communication node movement trailed by said comprehensive communication node failure as an out-of-range partition.

17. The method as recited in claim 13 further comprising combining said fault estimates to produce said meta-fault estimate.

18. The method as recited in claim 13 further comprising combining said fault estimates to produce said meta-fault estimate by using selected fault estimates from said local fault detectors over time and ranking said selected fault estimates according to a likelihood that a respective communication node is said fault location.

19. The method as recited in claim 13 wherein said meta-fault estimate is a transitory meta-fault and further comprising filtering said transitory meta-fault estimate.

20. A communication node, comprising:
    A processor; and memory including computer program code, said memory and said computer program code configured to, with said processor, cause said communication node to perform at least the following:
    receive fault estimates from local fault detectors at respective communication nodes in a mobile ad hoc network, a location of each of said fault estimates being associated with at least one of respective peer communication nodes based on a distance of each of said fault estimates from said respective communication nodes;
    produce a meta-fault estimate at a global fault detector from at least ones of said fault estimates; and
    determine communication nodes as fault locations for said meta-fault estimate.

21. The communication node as recited in claim 20 wherein said memory and said computer program code are further configured to, with said processor, cause said communication node to provide a fault state and said meta-fault estimate with associated fault locations to a network communication node.

22. The communication node as recited in claim 20 wherein said meta-fault estimate comprises an out-of-range communication node movement, a comprehensive communication node failure or congestion of another communication node.

23. The communication node as recited in claim 22 wherein said memory and said computer program code are further configured to, with said processor, cause said communication node to interpret said out-of-range communication node movement trailed by said comprehensive communication node failure as an out-of-range partition.

24. The communication node as recited in claim 20 wherein said memory and said computer program code are further configured to, with said processor, cause said communication node to combine said fault estimates to produce said meta-fault estimate.

25. The communication node as recited in claim 20 wherein said memory and said computer program code are further configured to, with said processor, cause said communication node to combine said fault estimates to produce said meta-fault estimate by using selected fault estimates from said local fault detectors over time and rank said selected fault estimates according to a likelihood that a respective communication node is said fault location.

26. The communication node as recited in claim 20 wherein said meta-fault estimate is a transitory meta-fault and wherein said memory and said computer program code are further configured to, with said processor, cause said communication node to filter said transitory meta-fault estimate.

* * * * *

UNITED STATES PATENT AND TRADEMARK OFFICE
CERTIFICATE OF CORRECTION

PATENT NO. : 9,167,463 B2  
APPLICATION NO. : 13/602796  
DATED : October 20, 2015  
INVENTOR(S) : Serban et al.

Page 1 of 1

It is certified that error appears in the above-identified patent and that said Letters Patent is hereby corrected as shown below:

On the title page, item [56], Column 2, Line 3, delete "MobiQuitous, 2009. MobiQuitous '09." and insert -- MobiQuitous, 2009. --, therefor.

On the title page 2, item [56], Column 2, Line 2, delete "Enviornments,"" and insert -- Environments," --, therefor.

In the specification

Column 6, Line 58, delete "info cation." and insert -- information. --, therefor.

Column 11, Line 13, delete "("REF")" and insert -- ("RBF") --, therefor.

Column 13, Line 63, delete "$LC_{ij\ =\{0,1\}}$" and insert -- $LC_{ij} = \{0, 1\}$ --, therefor.

Column 18, Line 45, delete "ones" and insert -- one --, therefor.

Column 19, Line 48, delete "ones" and insert -- one --, therefor.

In the claims

Column 22, Line 19, Claim 13, delete "ones" and insert -- one --, therefor.

Column 22, Line 46, Claim 20, delete "A processor;" and insert -- a processor; --, therefor.

Column 22, Line 57, Claim 20, delete "ones" and insert -- one --, therefor.

Signed and Sealed this  
Fifth Day of April, 2016

Michelle K. Lee  
*Director of the United States Patent and Trademark Office*